(12) United States Patent
Chen et al.

(10) Patent No.: US 10,740,659 B2
(45) Date of Patent: Aug. 11, 2020

(54) FUSING SPARSE KERNELS TO APPROXIMATE A FULL KERNEL OF A CONVOLUTIONAL NEURAL NETWORK

(71) Applicant: International Business Machines Corporation, Armonk, NY (US)

(72) Inventors: Richard Chen, Mount Kisco, NY (US); Quanfu Fan, Lexington, MA (US); Marco Pistoia, Amawalk, NY (US); Toyotaro Suzumura, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 320 days.

(21) Appl. No.: 15/841,480

(22) Filed: Dec. 14, 2017

(65) Prior Publication Data
US 2019/0188526 A1    Jun. 20, 2019

(51) Int. Cl.
*G06K 9/62* (2006.01)
*G06N 3/04* (2006.01)
*G06N 3/08* (2006.01)

(52) U.S. Cl.
CPC .......... *G06K 9/629* (2013.01); *G06K 9/6256* (2013.01); *G06K 9/6267* (2013.01); *G06N 3/04* (2013.01); *G06N 3/08* (2013.01)

(58) Field of Classification Search
None
See application file for complete search history.

(56) References Cited

U.S. PATENT DOCUMENTS

| 2016/0267622 A1 | 9/2016 | Brothers et al. |
| 2017/0032487 A1 | 2/2017 | Ashari et al. |
| 2017/0103308 A1 | 4/2017 | Chang et al. |

(Continued)

FOREIGN PATENT DOCUMENTS

| CN | 107330463 | 11/2017 |
| WO | 2017132830 | 8/2017 |

OTHER PUBLICATIONS

Wang et al., "Visual Tracking via Kernel Sparse Representation with Multikernel Fusion" (Year: 2016).*

(Continued)

*Primary Examiner* — Chan S Park
*Assistant Examiner* — Elisa M Rice
(74) *Attorney, Agent, or Firm* — Amin, Turocy & Watson, LLP

(57) ABSTRACT

Techniques facilitating generation of a fused kernel that can approximate a full kernel of a convolutional neural network are provided. In one example, a computer-implemented method comprises determining a first pattern of samples of a first sample matrix and a second pattern of samples of a second sample matrix. The first sample matrix can be representative of a sparse kernel, and the second sample matrix can be representative of a complementary kernel. The first pattern and second pattern can be complementary to one another. The computer-implemented method also comprises generating a fused kernel based on a combination of features of the sparse kernel and features of the complementary kernel that are combined according to a fusing approach and training the fused kernel.

20 Claims, 11 Drawing Sheets

(56) References Cited

U.S. PATENT DOCUMENTS

2017/0132496 A1     5/2017   Shoaib et al.
2017/0337471 A1    11/2017   Kadav et al.

OTHER PUBLICATIONS

Huang et al., "Learning Kernel Extended Dictionary for Face Recognition" (Year: 2016).*

Yang et al., "Enhancing Person Re-identification in a Self-Trained Subspace" (Year: 2016).*

Feichtenhofer et al., "Conditional Two-Stream Network Fusion for Video Action Recognition" (Year: 2016).*

International Search Report and Written Opinion for PCT Application No. PCT/IB2018/059993 dated Mar. 13, 2019, 10 pgs.

Wu et al., "Multi-Stream Multi-Class Fusion of Deep Networks for Video Classification," Proceedings of the 2016 ACM on Multimedia Conference, 2016, pp. 791-800, ACM, 10 pages.

Vedaldi et al., "Sparse Kernel Approximations for Efficient Classification and Detection," 2012, 8 pages.

Sun et al., "Design of Kernels in Convolutional Neural Networks for Image Classification," Computer Vision and Pattern Recognition. DOI: arXiv:1511.09231, ECCV 2016, Part VII, LNCS 9911, pp. 51-66, 2016. 16 pages.

Chen et al., "Efficient Convolutional Neural Network with Sparse and Complementary Kernels," 2016, International Business Machines Corporation, 21 pages.

Lai et al., "Pruning Redundant Neurons and Kernels of Deep Convolutional Neural Networks," Filed Oct. 19, 2017 and assigned U.S. Appl. No. 15/788,523, International Business Machines Corporation, 32 pages.

Han et al., "Deep Compression: Compressing Deep Neural Networks with Pruning, Trained Quantization and Huffman Coding," ICLR, 2016, 14 pages.

Reddy et al., "A Survey of Applications and Performance of Deep Convolution Neural Network Architecture for Image Segmentation," IJCTA, 2017, pp. 979-989, vol. 10, No. 9, International Science Press, 11 pages.

Chen et al., "DeepLab: Semantic Image Segmentation with Deep Convolutional Nets, Atrous Convolution, and Fully Connected CRFs," Jun. 2, 2016, 14 pages.

Ioannou et al., "Training CNNs with Low-rank Filters for Efficient Image Classification," ICLR, 2016, 17 pages.

Liu et al., "Sparse Convolutional Neural Networks," 2015, pp. 806-814, IEEE, 9 pages.

Wen et al., "Learning Structured Sparsity in Deep Neural Networks," 30th Conference on Neural Information Processing Systems, 2016, 9 pages.

Zhou et al., "Less is More: Towards Compact CNNs," Retrieved on Sep. 28, 2017, 16 pages.

* cited by examiner

FUSING SPARSE KERNELS TO APPROXIMATE A FULL KERNEL OF A CONVOLUTIONAL NEURAL NETWORK

TECHNICAL FIELD

The subject disclosure relates to fusing sparse kernels and convolutional neural networks (CNNs).

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for parallel deep learning are described.

According to an embodiment of the present invention, a system can comprise a memory that stores computer executable components and a processor that executes computer executable components stored in the memory. The computer executable components can comprise a pattern component that determines a first pattern of a sparse kernel and a second pattern of a complementary kernel. The sparse kernel can comprise a first sample matrix composed of skipped samples and valid samples, and the first pattern can represent locations within the first sample matrix of the valid samples. The complementary kernel can comprise a second sample matrix composed of skipped samples and valid samples, and the second pattern can represent locations within the second sample matrix of the valid samples that are complementary to the first pattern. The computer executable components can comprise a fusing component that can generate a fused kernel based on a combination of features of the sparse kernel and features of the complementary kernel that are combined according to a fusing approach. The fused kernel can represent an approximation of a full kernel of a convolutional neural network. The computer executable components can further comprise a training component that can train the fused kernel.

In some embodiments, elements described in connection with the system can be embodied in different forms such as a computer-implemented method, a computer program product, or another form.

DETAILED DESCRIPTION

Figure 1:
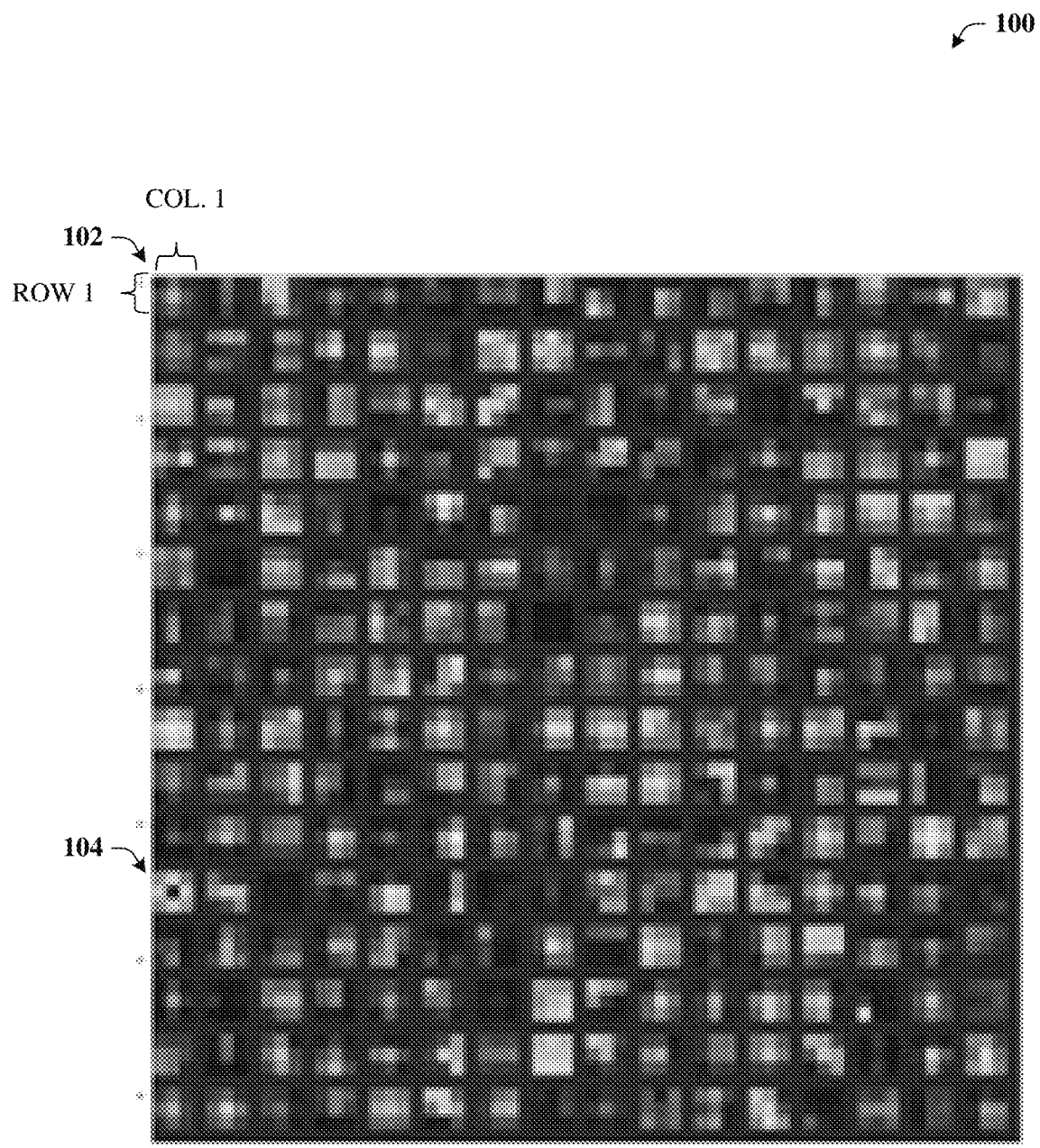
FIG. 1 illustrates a diagram depicting a weights visualization of a typical pre-trained CNN in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

A CNN can represent a type of machine learning that can utilize deep, feed-forward artificial neural networks. CNN's have shown significant success in image and video recognition, recommender systems, natural language processing, and other areas. Typically, a CNN architecture is formed by a stack of distinct layers that transform an input volume into an output volume through a differentiable function, while holding class scores. CNNs generally comprise several distinct types of layers that are commonly used. For example, the convolutional layer can be a core building block of a CNN. Parameters of the convolutional layer typically comprise a set of learnable filters, which are referred to herein as "kernels". For instance, a kernel can be represented by a matrix. For the sake of simplicity, a 3×3 matrix is employed in this document to demonstrate certain aspects or techniques, but it is understood that the disclosed subject matter can be employed with substantially any matrix size such as, for example, a 5×5 matrix, a 7×7 matrix, and so forth.

A given kernel typically has a small receptive field, but can extend through the full depth of the input volume. During a forward pass of the CNN, each kernel can be convolved across the width and height of the input volume, computing the dot product between entries of the kernel and the input, producing a 2-dimensional activation map of that kernel. As one result, the CNN can learn filters that activate when some specific type of feature at some spatial position in the input is detected. Stacking the activation maps for all filters along the depth dimension can form the full output volume of the convolutional layer. Every entry in the output volume can thus also be interpreted as an output of a 'neuron' that looks at a small region of the input and shares parameters with the neurons in the same activation map.

Convolutional neural networks typically have very heavy computational load and a large model size. In order to increase accuracy, a deep CNN is often substantially over-parameterized, e.g., implemented with numerous unnecessary parameters. Due to the heavy computational load and large model size that are associated with computations on a full kernel, it has been observed that approximations of a full kernel may provide advantages when the approximation is used rather than the full kernel. One way to approximate a full kernel is referred to as low-rank approximation in which lower rank matrices (e.g., a 3×1×a 1×3) are combined to represent an approximation of the full (e.g., 3×3) kernel. Such techniques may reduce computational load and model size, but also tend to reduce the receptive field as well as potential accuracy of the model.

Another way to approximate a full kernel is to use a sparsified kernel. A sparsified kernel omits or skips parameters at one or more of the spatial locations based on some strategy, typically omitting those sample locations having low parameter weights. Such also tends to provide trade-offs between reducing load and model size vs. model accuracy, e.g., due to a reduced receptive field.

As further detailed herein, another way to approximate a full kernel is to fuse multiple sparse kernels. Moreover, these sparse base kernels can be determined or selected based on a deterministic spatial pattern, which can provide advantages that will become apparent. To illustrate, consider a fully trained CNN that uses full kernels, of which numerous examples exist in the art. FIG. 1 depicts diagram 100 that illustrates a weights visualization of a typical pre-trained CNN. In that regard, diagram 100 illustrates several rows and columns of kernels. As illustrated kernel 102 is in row 1 of column 1. Kernel 102 is representative of a 3×3 matrix and each element of the 3×3 matrix can represent a different spatial location. Each of these locations (e.g., samples) is shaded based on an associated parameter weight, with lighter shading representing heavier parameter weights.

As an observation, it is noted that numerous kernels of this example fully trained CNN layer have characteristics of sparsified kernels, e.g., low parameter weights for some samples, and high parameter weights for other samples. As another observation, the sparse nature of many of the kernels have similar patterns, such as a plus sign (e.g., '+') pattern and/or an 'x' pattern. For instance, see kernel 104.

The disclosed subject matter, in some embodiments, can provide an approximated kernel that approximates a full kernel, which is further detailed herein. Such can reduce the number of parameters, which can reduce computational resources (e.g., operations, runtime memory, disk space, etc.) in connection with executing the CNN. This approximated kernel can be the result of a fusion between multiple (e.g., two or more) sparse kernels. However, unlike other approaches in which kernels are sparsified based on a variable constraint (e.g., parameter weight), the sparse kernels of the disclosed subject matter, in some embodiments, can be deterministically selected based on one or more defined patterns (e.g., '+' shape, 'x' shape, etc.). Fusing sparse kernels to approximate a full kernel can represent a significant advantage over simply utilizing a sparse kernel to approximate the full kernel. Moreover, by deterministically selecting a pattern or shape associated with the sparse kernels to be fused, the receptive field of the approximated (e.g., fused) kernel can approximate the receptive field of the full kernel. In that regard, the sparse kernels to be fused can be deterministically selected to have patterns that are complementary to one another, which is further detailed below.

Figure 2:
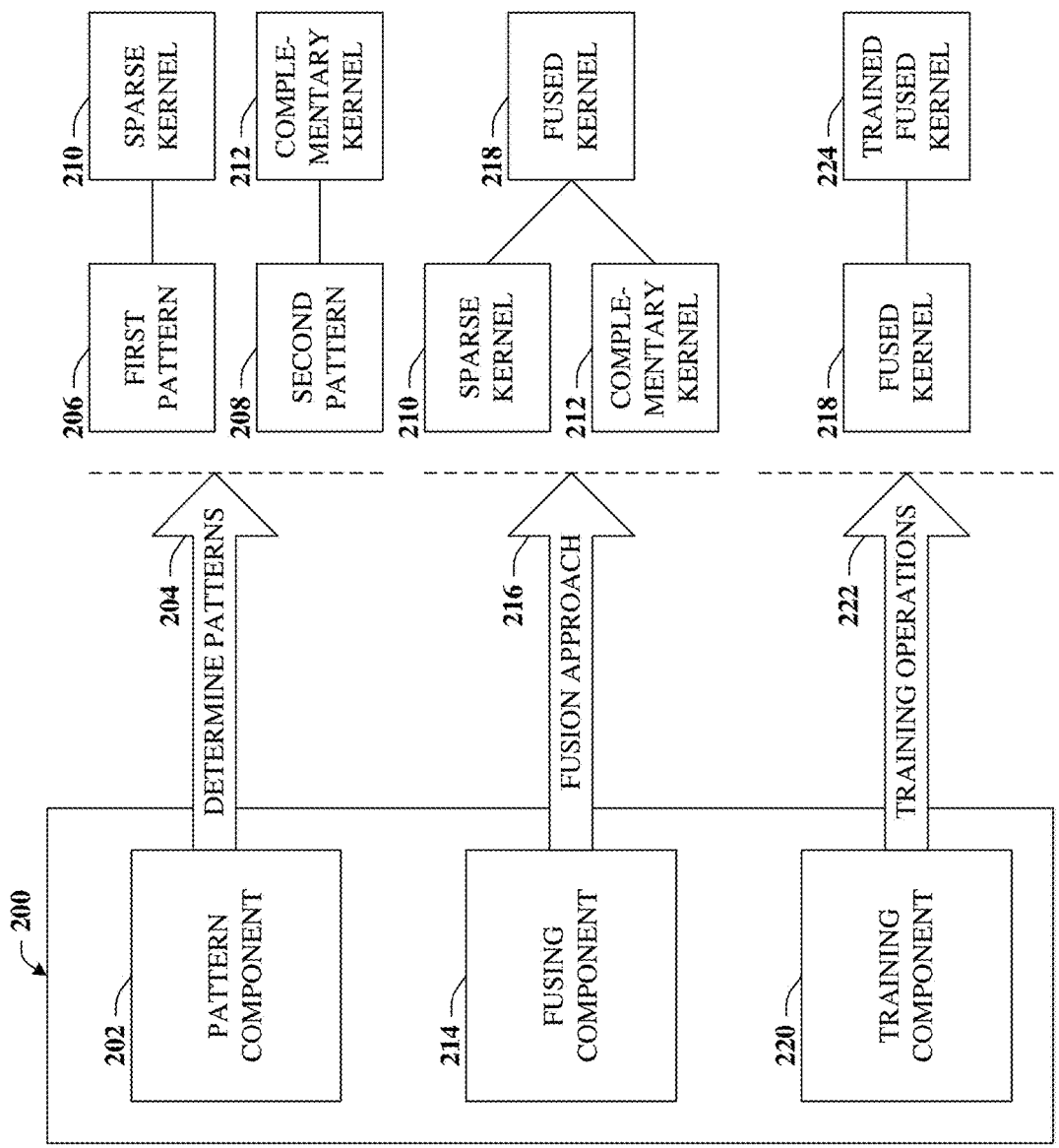
FIG. 2 illustrates a block diagram of an example, non-limiting system that fuses multiple sparse kernels to approximate a full kernel of a convolutional neural network in accordance with one or more embodiments described herein.

Turning again to the drawings, FIG. 2 illustrates a block diagram of an example, non-limiting system 200 that fuses multiple sparse kernels to approximate a full kernel of a convolutional neural network in accordance with one or more embodiments described herein. System 200 and/or the components of the system 200 can be employed to use hardware and/or software to solve problems that are highly technical in nature, that are not abstract, and that cannot be performed as a set of mental acts by a human. Indeed, some embodiments of the disclosed subject matter are directed to using non-biological architectures (e.g., computer hardware) programmed with deep learning techniques to emulate biological processes. By definition, a mental act performed by a human represents biological processes of, e.g., a neuron, but does not represent the emulation of a neuron by non-biological structural elements. Emulation of a neuron makes sense only when neurons themselves are not employed (otherwise there is no need to emulate), but rather when other architectures (e.g., computer hardware) are used and/or necessarily required. Further, some of the processes performed can be performed by specialized computers for carrying out defined tasks related to convolutional neural networks. System 200 and/or components of system 200 or other systems described herein, in some embodiments, can be employed to solve new problems that arise through advancements in technology, computer networks, the Internet, and the like. System 200, in some embodiments, can provide technical improvements to convolutional neural networks such as, e.g., reducing computational load, reducing model sizes, reducing a number of operations required, increasing model accuracy, and so on.

Figure 11:
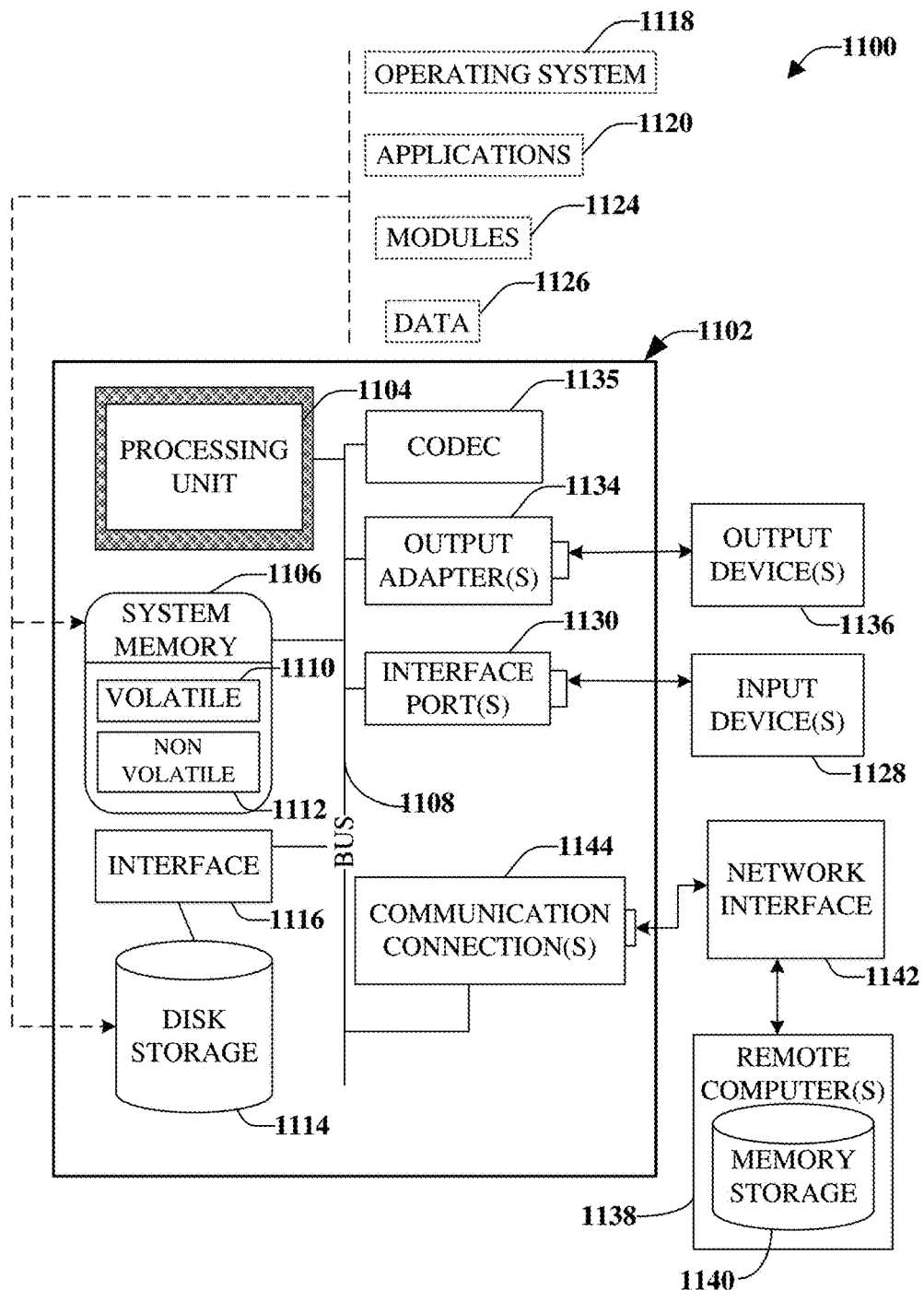
FIG. 11 illustrates a block diagram of an example, non-limiting operating environment in which one or more embodiments described herein can be facilitated.

System 200 can comprise a processor and a memory that stores executable instructions that, when executed by the processor, facilitate performance of operations. Examples of said processor and memory, as well as other suitable computer or computing-based elements, can be found with reference to FIG. 11, and can be used in connection with implementing one or more of the systems or components shown and described in connection with FIG. 2 or other figures disclosed herein.

In this example, system 200 can include pattern component 202. Pattern component 202 can determine or select various patterns and/or shapes associated with a kernel (e.g., filter) of a convolutional neural network. Such a determination is illustrated by reference numeral 204. It is understood that determination or selection of the patterns can be performed in a deterministic manner such that the pattern can be determined or known in advance and/or the pattern can be determined or known prior to the convolutional neural network being trained. For example, pattern component 202 can determine first pattern 206 and second pattern 208. First pattern 206 can represent a pattern or shape associated with sparse kernel 210, whereas second pattern 208 can represent a pattern or shape associated with complementary kernel 212 that can be complementary to first pattern 206.

In some embodiments, pattern component 202 can determine or select first pattern 206 and/or second pattern 208 based on data that is input or stored. In some embodiments, these data can reflect expertise, knowledge, or a policy regarding deterministic pattern selection. In some embodiments, these data can be based on an examination of parameter weights assigned to an original learned kernel of a previously trained convolutional neural network. For example, pattern component 202 can determine or select first pattern 206 based on examining parameter weights of a previously trained network, such as the example provided in connection with FIG. 1, or based on other data. In some embodiments, such data used to determine or select a specific deterministic pattern can be received as part of configuration data (not shown, but see configuration data 804 of FIG. 8).

Figure 3:
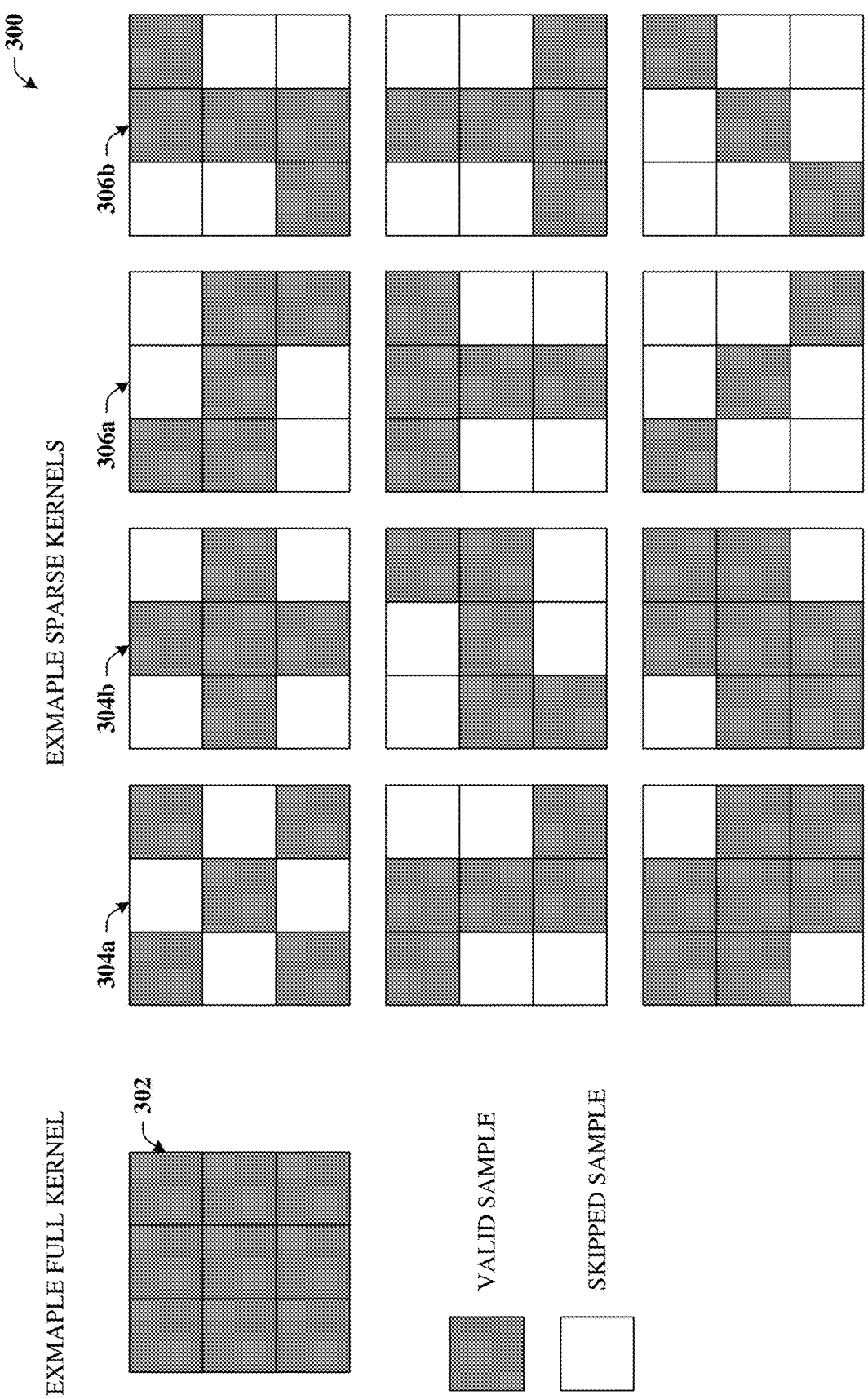
FIG. 3 illustrates a block diagram depicting various example representations of kernels of a convolutional neural network in accordance with one or more embodiments described herein.

While still referring to FIG. 2, but turning now as well to FIG. 3, block diagram 300 is illustrated. Block diagram 300 depicts various example representations of kernels of a convolutional neural network in accordance with one or more embodiments described herein. Repetitive description of like elements employed in other embodiments described herein is omitted for sake of brevity.

For instance, an example full kernel 302 is illustrated. A full kernel 302 can be one in which all samples are valid samples. Once again, here a kernel is representative of a 3×3 matrix, although it is understood that other matrix sizes are contemplated. As depicted, all nine of the spatial locations of the 3×3 matrix contain valid samples (e.g., having specified parameter weights, etc.). Hence, a valid sample is indicated by a sample region that is shaded, whereas a skipped sample (e.g., having no parameters, etc.) is indicated by a sample region with no shading (e.g., white). It is noted that such differs from FIG. 1 in which the shading of a sample region corresponds to underlying parameter weights, which, here, are not shown.

Also depicted are several examples of sparse kernels (e.g., sparse kernel 210 or complementary kernel 212) having certain deterministic patterns (e.g., first pattern 206 or second pattern 208) associated with the valid samples. In other words, a given sparse kernel such as sparse kernel 210 can comprise a first sample matrix (e.g., 3×3) comprising skipped samples and valid samples. The deterministic pattern associated with sparse kernel 210 such as first pattern 206 can represent locations within the first sample matrix of valid samples, noting that the number of operations and the number of parameters can be reduced based on the number of skipped samples.

Complementary kernel 212 can also represent a type of sparse kernel. That is, complementary kernel 212 can comprise a second sample matrix comprises skipped samples and valid samples. Second pattern 208 can represent location within the second sample matrix of valid samples. In some embodiments, the second pattern 208 can represent valid samples that are complementary to the valid samples indicated by first pattern 206. For instance, sparse kernel 304a forms an 'x' shape, whereas sparse kernel 304b forms a '+' shape. Since the valid samples of sparse kernel 304a are complementary to the valid samples of, or alternatively coincide with the skipped samples of, sparse kernel 304b, sparse kernel 304b can be a complementary kernel 212 of sparse kernel 304a, and vice versa. A similar example, albeit with different patterns, is depicted with respect to sparse kernels 306a and 306b. Additionally, numerous other examples are provided in connection with 3×3 matrices, although not exhaustive, and other matrix sizes will bear out other examples.

In some embodiments, complementary kernel 212 can be said to be 'complementary' to sparse kernel 210 if complementary kernel 212 (or a combination of multiple sparse kernels) comprises valid samples at all location within the second matrix that correspond to locations of sparse kernel 210 having skipped samples. In some embodiments, complementary kernel 212 can be said to be complementary to sparse kernel 210 if complementary kernel 212 (or a combination of multiple sparse kernels) comprises at least one valid sample within the second matrix that corresponds to a location within the first matrix of sparse kernel 210 of at least one skipped sample. It is appreciated that by deterministically selecting first pattern 206 and second pattern 208 to be complementary to one another, at least some skipped samples of first pattern 206 can be represented by valid samples of second pattern 208, which can result in a more robust approximation of the receptive field of a full kernel 302.

To effectuate these and other advantages in connection with some embodiments, sparse kernel 210 can be combined or 'fused' with complementary kernel 212, which can be further detailed by turning back to FIG. 2. For example, system 200 can comprise fusing component 214. Fusing component 214 can be configured to generate fused kernel 218 based on a combination of features of sparse kernel 210 and features of complementary kernel 212. As illustrated, fusing component 214 can construct or generate fused kernel 218 based on a fusing approach 216, examples of which are illustrated in connection with FIGS. 4-6.

Additionally, system 200 can comprise training component 220 that can be configured to perform training operations 222 to train fused kernel 218. For example, trained fused kernel 224 can be constructed or generated based on application of training operations 222 on fused kernel 218. In some embodiments, trained fused kernel 224 can be trained from scratch.

Figure 4:
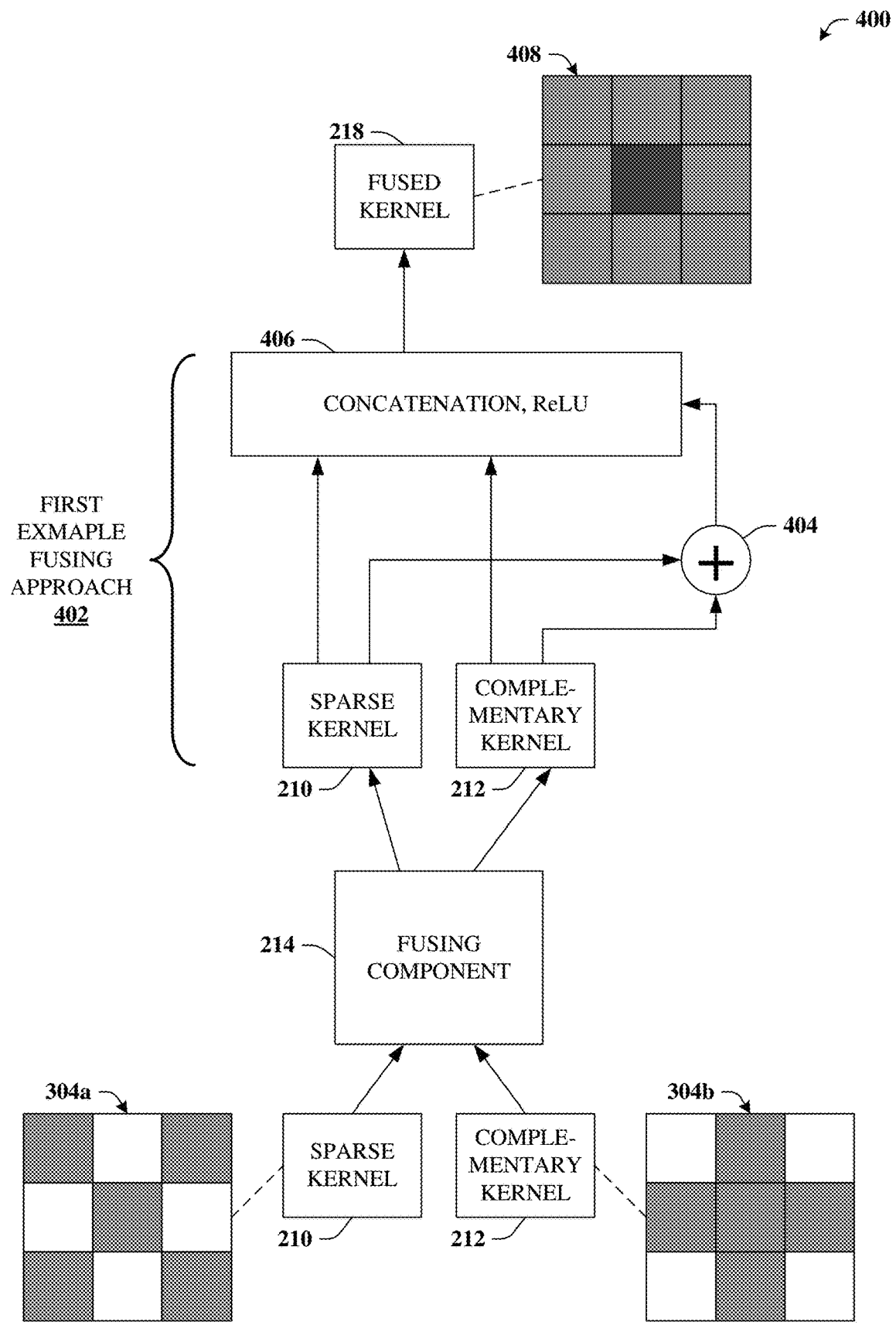
FIG. 4 illustrates a block diagram depicting a first example fusing approach in accordance with one or more embodiments described herein.

Referring now to FIG. 4, block diagram 400 is presented. Block diagram 400 illustrates a first example fusing approach in accordance with one or more embodiments described herein. Repetitive description of like elements employed in other embodiments described herein is omitted for sake of brevity. In this example, fusing component 214 can receive as inputs sparse kernel 210 and complementary kernel 212. It is understood that sparse kernel 210 and complementary kernel 212 can be sparsified according to some suitable procedure and/or are not full kernels having valid samples at all locations, but rather include skipped samples as well. It is further understood that the patterns associated with valid samples can be predetermined and/or deterministically selected or identified, and that these patterns can be complementary to one another. Thus, as an example, sparse kernel 210 can be represented as sparse kernel 304a having an 'x' shaped pattern, and complementary kernel 212 can be represented as sparse kernel 304b having a '+' shaped pattern, which is fully complementary to the 'x' shaped pattern of sparse kernel 304a.

In some embodiments, fusing component 214 can combine the features of sparse kernel 210 and the features of complementary kernel with a spatial-join operation that replaces a skipped samples of first pattern 206 with a valid sample of second pattern 208. Such is illustrated by first example fusing approach 402, which represents one example of fusing approach 216. In some embodiments, fusing approach 216 can combine sparse kernel 210 and complementary kernel 212 based on a pairwise concatenation of the sparse kernel and the complementary kernel according to an operator 404. In some embodiments operator 404 can be an addition operator, as illustrated. In some embodiments, operator 404 can be, in addition or alternatively, an inverse operator (e.g., multiply by −1).

As illustrated at reference numeral 406, the combination of sparse kernel 210 and complementary kernel 212 can be based on a suitable concatenation and rectified linear unit (ReLU) procedures can be employed. Fused kernel 218 can thus be generated, an example of which is provided by reference numeral 408. It is understood that fused kernel 218 can be an approximation of a full kernel. In some embodiments, fused kernel 218 can comprise fewer parameters than the full kernel, which can result in reduced computational resource requirements, but can have a receptive field that very closely approximates that of the full kernel.

Figure 5:
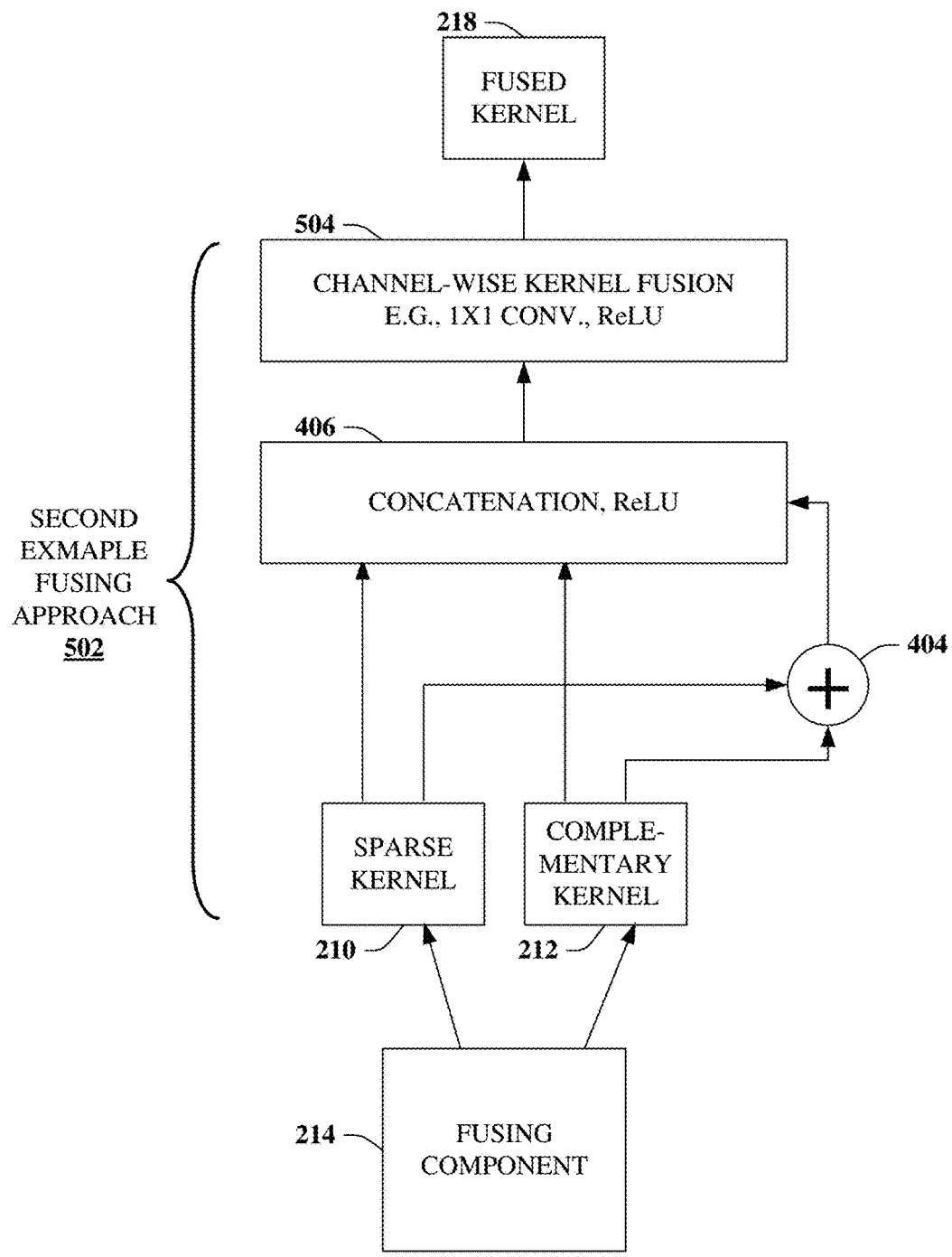
FIG. 5 illustrates a block diagram depicting a second example fusing approach in accordance with one or more embodiments described herein.

With reference now to FIG. 5, block diagram 500 is presented. Block diagram 500 illustrates a second example fusing approach in accordance with one or more embodiments described herein. Repetitive description of like elements employed in other embodiments described herein is omitted for sake of brevity. In this example, fusing component 214 can receive as inputs sparse kernel 210 and complementary kernel 212. In response, fusing component can perform a second example fusing approach 502, which can include combining sparse kernel 210 and complementary kernel 212 based on a pairwise concatenation of the sparse kernel and the complementary kernel according to an operator 404, as was substantially detailed in connection with first example fusing approach 402 of FIG. 4. Additionally or alternatively, second example fusing approach 502 can comprise a channel-wise fusion procedure comprising, combining features of the sparse kernel, the complementary kernel, and the fused kernel based on application of a 1×1 channel matrix in a channel dimension, which is illustrated at reference numeral 504. The result of this channel-wise kernel fusion can yield fused kernel 218.

Figure 6:
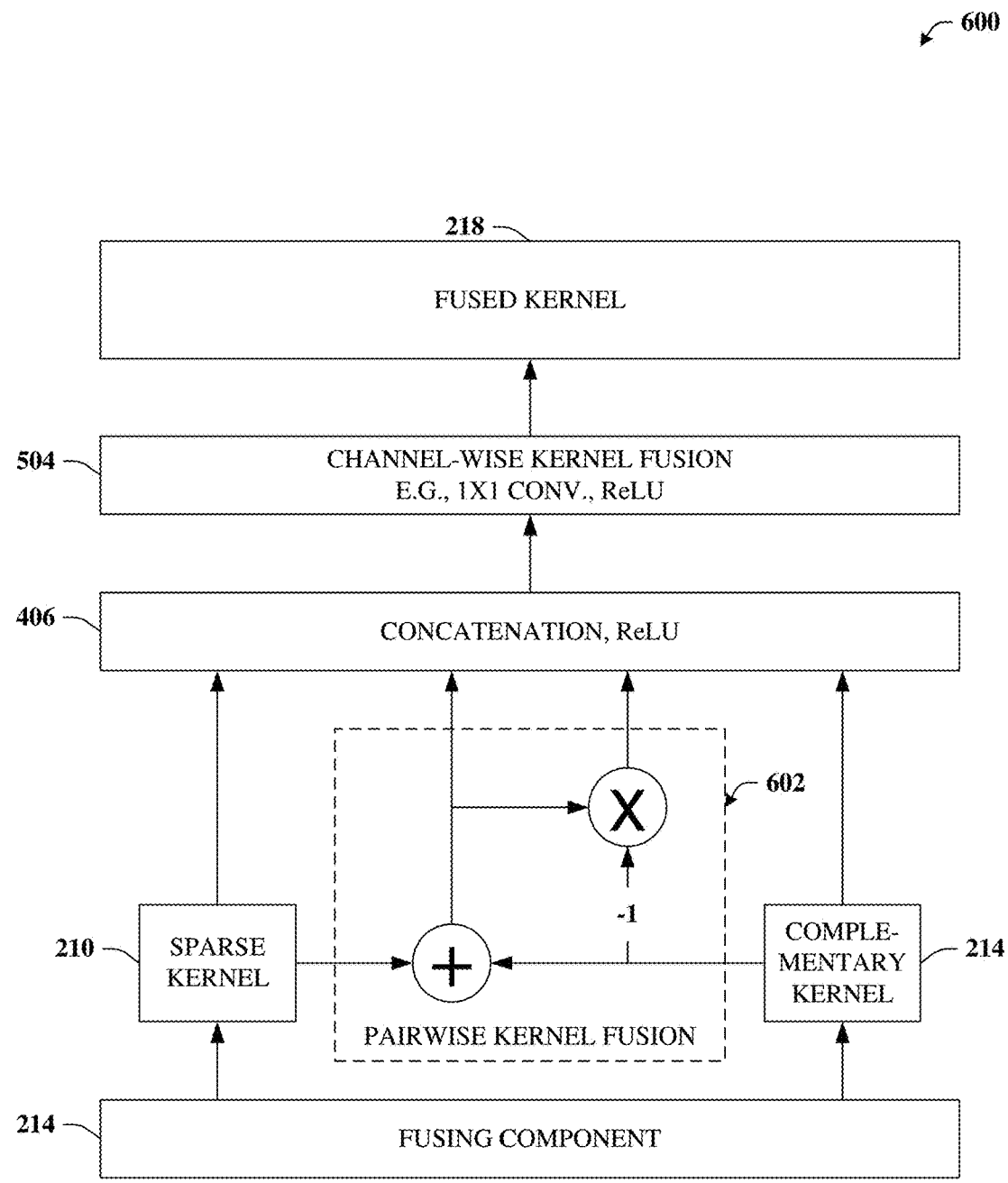
FIG. 6 illustrates a block diagram depicting example fusing approaches in more detail in accordance with one or more embodiments described herein.

Turning now to FIG. 6, block diagram 600 is presented. Block diagram 600 illustrates example fusing approaches in more detail in accordance with one or more embodiments described herein. Repetitive description of like elements employed in other embodiments described herein is omitted for sake of brevity. In some embodiments, fusing component 214 can combine sparse kernel 210 and complementary kernel 212 based on a pairwise kernel fusion procedure 602 of the sparse kernel and the complementary kernel according to one or more operator(s). In some embodiments the pairwise kernel fusion procedure 602 can utilize an addition operator, as illustrated. In some embodiments, pairwise kernel fusion procedure 602 can utilize, in addition or alternatively, an inverse operator (e.g., multiply by −1). In some embodiments, sparse kernel 210 and complementary kernel 212 can be combined by a selected operator or by multiple operators during the pairwise kernel fusion procedure 602. In some embodiments, the combination of sparse kernel 210 and complementary kernel 212 can employ one or more ReLU procedures.

Subsequent to concatenation and/or ReLU procedures illustrated at reference numeral 406, or in some embodiments, prior to reference numeral 406, suitable data can be fused according to channel-wise fusion procedure 504, as detailed according to second example fusing approach 502 of FIG. 5. The result can be fused kernel 218.

Figure 7:
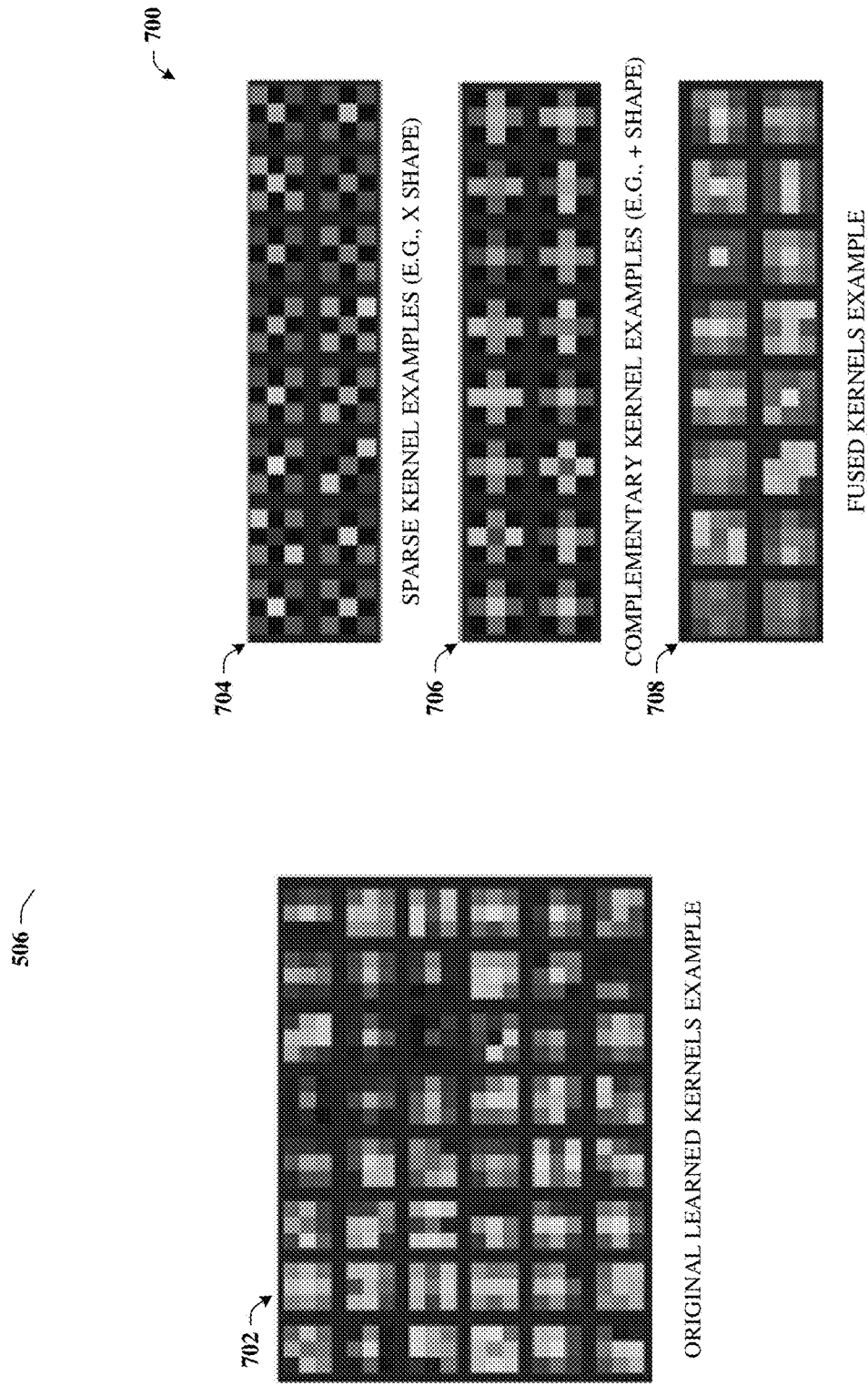
FIG. 7 illustrates a diagram that provides an illustrative weights visualization comparison of an original learned kernel example with various examples of sparse kernels, complementary kernels, and fused kernels in accordance with one or more embodiments described herein.

Referring now to FIG. 7, diagram 700 is presented. Diagram 700 provides an illustrative weights visualization comparison of an original learned kernel example with various examples of sparse kernels, complementary kernels, and fused kernels in accordance with one or more embodiments described herein. Repetitive description of like elements employed in other embodiments described herein is omitted for sake of brevity. Diagram 700 presents a weights visualization view. For instance, various example 3×3 kernels are depicted, and the spatial locations of the individual kernels are shaded according to parameter weights for the corresponding location, similar to FIG. 1. Lighter shading gradients reflect higher parameter weights.

Reference numeral 702 represents a weights visualization of an original learned kernel. Reference numerals 704 and 706 represent weights visualizations of sparse kernels that are complementary to one another. In this example, kernels depicted by reference numeral 704 represent kernels having an x shaped pattern, whereas kernels depicted by reference numeral 706 represent kernels having a + shaped pattern. Reference numeral 708 represents corresponding fused kernels that have been fused according to techniques detailed above.

Figure 8:
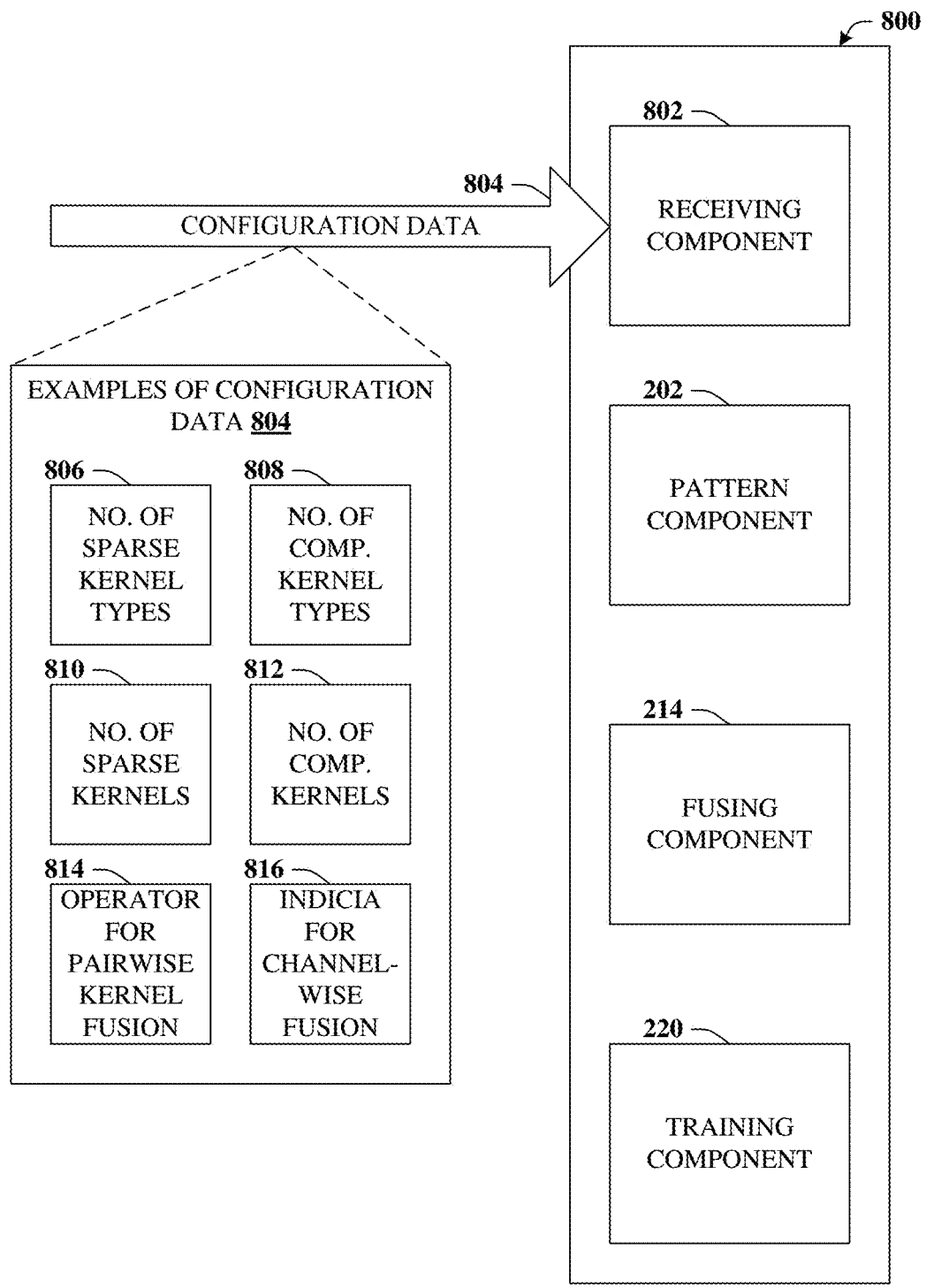
FIG. 8 illustrates a block diagram of an example, non-limiting system that fuses multiple sparse kernels to approximate a full kernel of a convolutional neural network in accordance with one or more embodiments described herein.

Turning now to FIG. 8, system 800 is presented. System 800 illustrates a block diagram of an example, non-limiting system 800 that fuses multiple sparse kernels to approximate a full kernel of a convolutional neural network in accordance with one or more embodiments described herein. Repetitive description of like elements employed in other embodiments described herein is omitted for sake of brevity. System 800 can be substantially similar to system 200. Additionally, system 800 can further comprise receiving component 802. Receiving component 802 can be configured to receive configuration data 804 that can be employed to configure and/or specify operating parameters of systems 200 or 800. As already detailed, configuration data 804 can comprise data that can be used (e.g., by pattern component 202) to specify, select, or otherwise determine first pattern 206 or second pattern 208, which can be the product of implementation characteristics, expertise, or previously stored data, or be based on observations associated with certain layers of other trained convolutional neural networks.

In some embodiments, configuration data 804 can further comprise a number of types of sparse kernels and/or a number of types of complementary kernels, which are indicated by reference numerals 806 and 808, respectively. Non-exhaustive and non-limiting examples of the types of sparse kernels and/or complementary kernels are provided with reference to FIG. 3. In some embodiments, configuration data 804 can comprise a number of sparse kernels and/or a number of complementary kernels, which are indicated by reference numerals 810 and 812, respectively.

In some embodiments, configuration data 804 can comprise data that indicates or designates an operator for pairwise kernel fusion, which is illustrated by reference numeral 814. For example, referring to pairwise kernel fusion 602 of FIG. 6, the addition operator can be indicated, the inverse operator, or another suitable operator, as well as combinations thereof can be designated. In some embodiments, configuration data 804 can comprise data that indicates whether channel-wise fusion is to be used, which is illustrated by reference numeral 816. For instance, if channel-wise fusion is not to be used, then first example fusing approach 402 of FIG. 4 can be employed. On the other hand, if channel-wise fusion is to be used, then second example fusing approach 502 of FIG. 5 can be employed.

Figure 9:
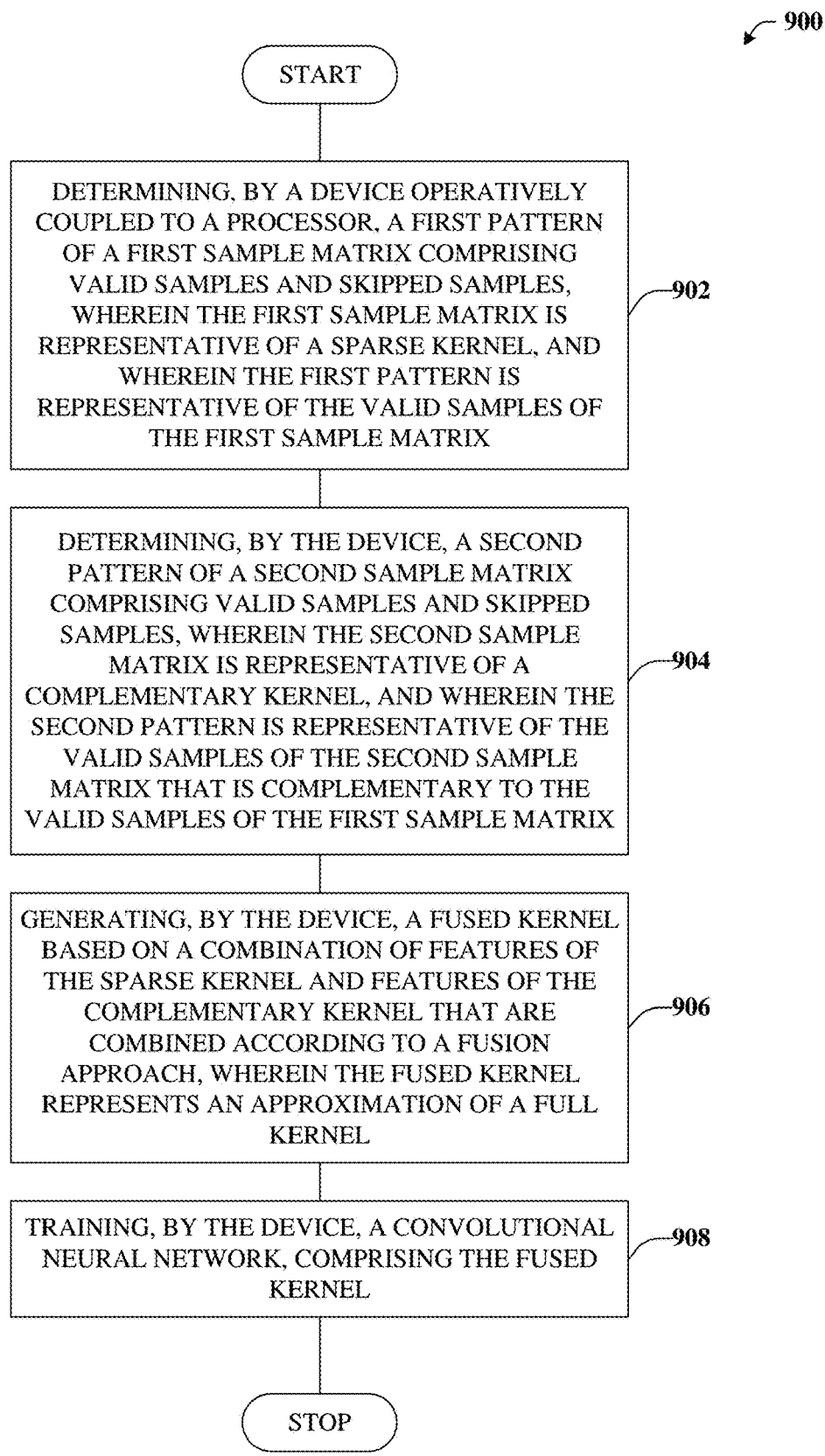
FIG. 9 illustrates a flow diagram of an example, non-limiting computer-implemented method that can fuse multiple sparse kernels to approximate a full kernel of a convolutional neural network in accordance with one or more embodiments described herein.
Figure 10:
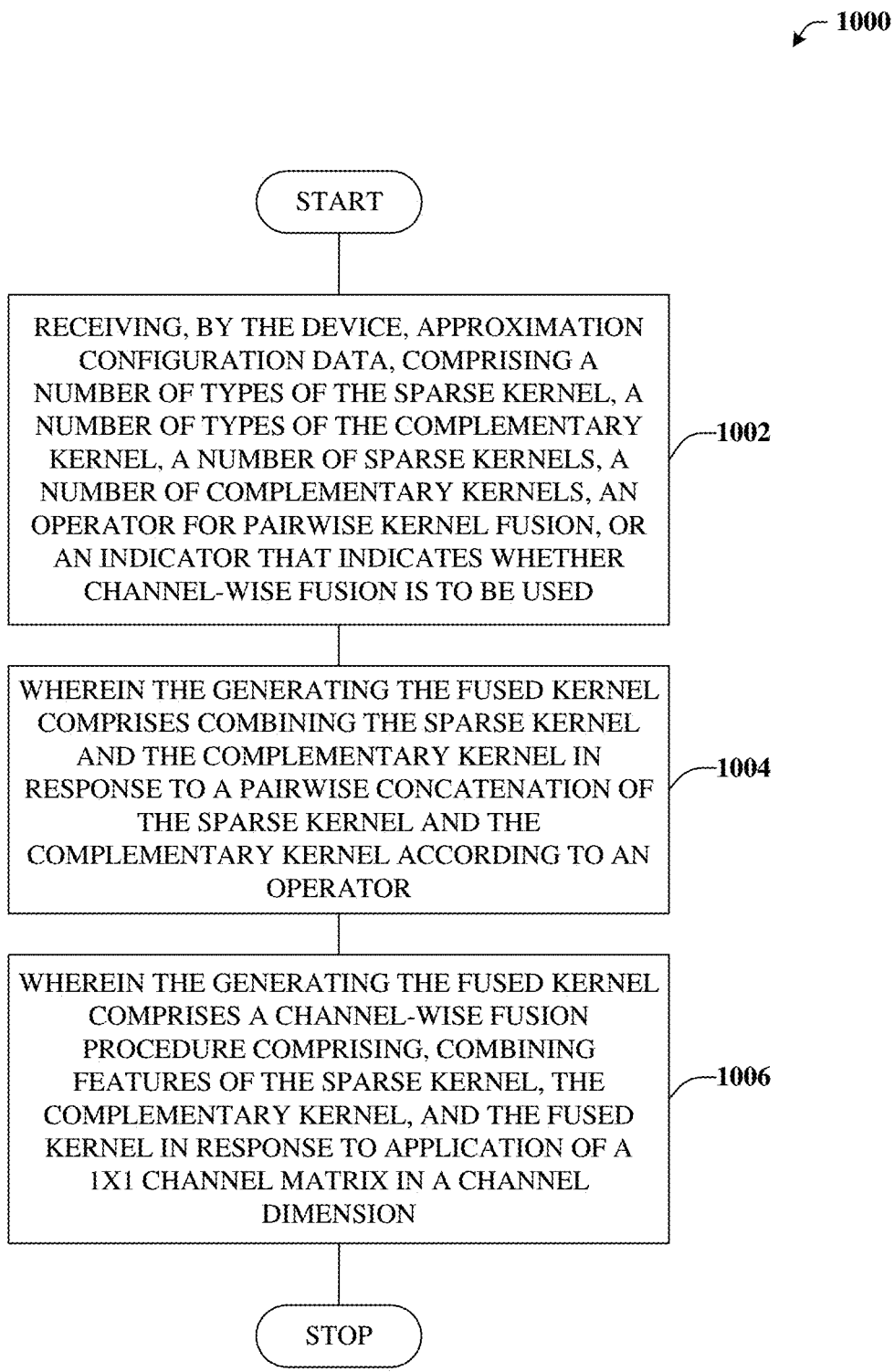
FIG. 10 illustrates a flow diagram of an example, non-limiting computer-implemented method that can provide for additional aspects or elements for fusing multiple sparse kernels to approximate a full kernel of a convolutional neural network in accordance with one or more embodiments described herein.

FIGS. 9 and 10 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 9 illustrates a flow diagram 900 of an example, non-limiting computer-implemented method that can fuse multiple sparse kernels to approximate a full kernel of a convolutional neural network in accordance with one or more embodiments described herein. Repetitive description of like elements employed in other embodiments described herein is omitted for sake of brevity. At reference numeral 902, a device (e.g., system 200, 800) operatively coupled to a processor can determine a first pattern of a first sample matrix comprising valid samples and skipped samples. The first sample matrix can be representative of a sparse kernel and the first pattern can be representative of the valid samples of the first sample matrix.

At reference numeral 904, the device can determine a second pattern of a second sample matrix comprising valid samples and skipped samples. The second sample matrix can be representative of a complementary kernel. The second pattern can be representative of the valid samples of the second sample matrix. The valid samples of the second sample matrix can be complementary to the valid samples of the first sample matrix.

At reference numeral 906, the device can generate a fused kernel based on a combination of features of the sparse kernel and features of the complementary kernel that are combined according to a fusing approach. The fused kernel can represent an approximation of a full kernel. In some embodiments, the fused kernel can have fewer parameters than the full kernel, which can result in fewer operations and reduced resources consumed to operate the convolutional neural network as well as a more compact CNN model. In some embodiments, the fused kernel can have receptive field that substantially approximates the receptive field of a full kernel.

At reference numeral 908, the device can train a convolutional neural network that comprises the fused kernel.

Turning now to FIG. 10, illustrated is a flow diagram 1000 of an example, non-limiting computer-implemented method that can provide for additional aspects or elements for fusing multiple sparse kernels to approximate a full kernel of a convolutional neural network in accordance with one or more embodiments described herein. Repetitive description of like elements employed in other embodiments described herein is omitted for sake of brevity. At reference numeral 1002, the device (e.g., system 200, 800) can receive configuration data. The configuration data can comprise a number of types of the sparse kernel, a number of types of the complementary kernel, a number of sparse kernels, a number of complementary kernels, identification of an operator for pairwise kernel fusion, or an indicator that indicates whether channel-wise fusion is to be used.

At reference numeral 1004, the device can generate the fused kernel. Generation of the fused kernel can comprise combining the sparse kernel and the complementary kernel based on a pairwise concatenation of the sparse kernel and the complementary kernel according to an operator.

At reference numeral 1006, the device can generate the fused kernel according to a different or expanded approach. For example, generation of the fused kernel can comprise a channel-wise fusion procedure. The channel-wise fusion procedure can comprise, combining features of the sparse kernel, the complementary kernel, and the fused kernel based on application of a 1×1 channel matrix in a channel dimension.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes computer executable components stored in the memory, wherein the computer executable components comprise:
   a pattern component that:
      determines a first pattern of a sparse kernel of a set of sparse kernels, wherein the first pattern represents locations of valid samples within a first sample matrix of the sparse kernel, and
      selects a complementary kernel, from the set of sparse kernels, that has a second pattern that represents locations of valid samples within a second sample matrix of the complementary kernel that are complementary to the first pattern, and wherein the complementary kernel comprises at least one valid sample at a location within the second sample matrix that corresponds to a location within the first sample matrix of at least one skipped sample that is other than the valid samples of the first sample matrix;
   a fusing component that, based on a combination of features of the sparse kernel and features of the complementary kernel that are combined according to a fusing approach, generates a fused kernel representing an approximation of a full kernel of a convolutional neural network; and a training component that trains the fused kernel.

2. The system of claim 1, wherein the fusing approach combines the features of the sparse kernel and the features of the complementary kernel with a spatial-join operation that replaces a skipped sample of the first sample matrix with a valid sample of the second sample matrix.

3. The system of claim 1, wherein the fusing approach combines the sparse kernel and the complementary kernel based on a pairwise concatenation of the sparse kernel and the complementary kernel according to an operator.

4. The system of claim 3, wherein the operator is an addition operator.

5. The system of claim 3, wherein the operator is an inverse operator.

6. The system of claim 1, wherein the fusing approach comprises a channel-wise fusion procedure comprising, combining features of the sparse kernel, the complementary kernel, and the fused kernel based on application of a 1×1 channel matrix in a channel dimension.

7. The system of claim 1, wherein the complementary kernel comprises valid samples at all locations within the second sample matrix that correspond to locations within the first sample matrix having skipped samples that are not the valid samples.

8. The system of claim 1, wherein the pattern component determines the first pattern based on an examination of parameter weights assigned to an original learned full kernel of a previously trained convolutional neural network.

9. The system of claim 1, wherein the first sample matrix of the sparse kernel is a 3×3 matrix and the first pattern has a "+" shape, and wherein the second sample matrix of the complementary kernel is a 3×3 matrix and the second pattern has an "x" shape.

10. The system of claim 1, further comprising a receiving component that receives configuration data comprising at least one of: a number of types of the sparse kernel; a number of types of the complementary kernel; a number of sparse kernels; a number of complementary kernels; an operator for pairwise kernel fusion; or an indicator that indicates whether channel-wise fusion is to be used.

11. A computer program product for approximating kernels of a convolutional neural network, the computer program product comprising a computer readable storage medium having program instructions embodied therewith, the program instructions executable by a processor to cause the processor to:

determine, by the processor, a first pattern of valid samples of a first sample matrix of a sparse kernel of a set of sparse kernels;

select, by the processor, a complementary kernel, from the set of sparse kernels, that has a second pattern of valid samples of a second sample matrix of the complementary kernel, wherein the second pattern is complementary to the first pattern, and wherein the complementary kernel comprises at least one valid sample at a location within the second sample matrix that corresponds to a location within the first sample matrix of at least one skipped sample that is other than the valid samples the first sample matrix;

generate, by the processor, a fused kernel based on a combination of features of the sparse kernel and features of the complementary kernel that are combined according to a fusing approach, wherein the fused kernel represents an approximation of a full kernel of the convolutional neural network; and train, by the processor, the fused kernel.

12. The computer program product of claim 11, wherein the fusing approach combines the sparse kernel and the complementary kernel based on a pairwise concatenation of the sparse kernel and the complementary kernel according to an operator.

13. The computer program product of claim 11, wherein the fusing approach comprises a channel-wise fusion procedure comprising, combining features of the sparse kernel, the complementary kernel, and the fused kernel based on application of a 1×1 channel matrix in a channel dimension.

14. The computer program product of claim 11, wherein the first pattern is determined based on an input.

15. The computer program product of claim 14, wherein the input is based on an examination of parameter weights assigned to a predetermined full kernel of a previously trained convolutional neural network.

16. A computer-implemented method, comprising:

determining, by a device operatively coupled to a processor, a first pattern of samples of a first sample matrix that is representative of a sparse kernel;

selecting, by the device, a complementary kernel, from the set of sparse kernels, that has a second pattern of samples, complementary to the first pattern, of a second sample matrix that is representative of the complementary kernel, and wherein the second pattern comprises at least one valid sample at a location within the second sample matrix that corresponds to a location within the first sample matrix of at least one skipped sample that is other than valid samples of the first sample matrix;

generating, by the device, a fused kernel based on a combination of features of the sparse kernel and features of the complementary kernel that are combined according to a fusing approach, wherein the fused kernel represents an approximation of a full kernel; and training, by the device, a convolutional neural network comprising the fused kernel.

17. The computer-implemented method of claim 16, further comprising receiving, by the device, configuration data comprising a number of types of the sparse kernel, a number of types of the complementary kernel, a number of sparse kernels, a number of complementary kernels, identification of an operator for pairwise kernel fusion, or an indicator that indicates whether channel-wise fusion is to be used.

18. The computer-implemented method of claim 16, wherein the generating the fused kernel comprises combining the sparse kernel and the complementary kernel based on a pairwise concatenation of the sparse kernel and the complementary kernel according to an operator.

19. The computer-implemented method of claim 16, wherein the generating the fused kernel comprises a channel-wise fusion procedure comprising, combining features of the sparse kernel, the complementary kernel, and the fused kernel based on application of a 1×1 channel matrix in a channel dimension.

20. The computer-implemented method of claim 16, wherein the complementary kernel comprises valid samples at all locations within the second sample matrix that correspond to locations within the first sample matrix having skipped samples that are not the valid samples.

* * * * *